United States Patent
Ender et al.

(10) Patent No.: US 12,257,716 B2
(45) Date of Patent: Mar. 25, 2025

(54) SYSTEM FOR GUIDING THE MOVEMENT OF A MANIPULATOR HAVING A FIRST PROCESSOR AND AT LEAST ONE SECOND PROCESSOR

(71) Applicant: Siemens Aktiengesellschaft, Munich (DE)

(72) Inventors: Stefan Ender, Gessertshausen (DE); Holger Mönnich, Friedberg (DE)

(73) Assignee: Siemens Aktiengesellschaft, Munich (DE)

( * ) Notice: Subject to any disclaimer, the term of this patent is extended or adjusted under 35 U.S.C. 154(b) by 590 days.

(21) Appl. No.: 15/930,506

(22) Filed: May 13, 2020

(65) Prior Publication Data
US 2020/0361087 A1  Nov. 19, 2020

(30) Foreign Application Priority Data
May 15, 2019  (EP) .................................... 19174700

(51) Int. Cl.
B25J 9/16  (2006.01)
(52) U.S. Cl.
CPC ............. *B25J 9/1664* (2013.01); *B25J 9/161* (2013.01); *B25J 9/1674* (2013.01)
(58) Field of Classification Search
CPC ........ B25J 9/1664; B25J 9/161; B25J 9/1674; B25J 9/1602; G05B 2219/2205;
(Continued)

(56) References Cited

U.S. PATENT DOCUMENTS 7,685,354 B1 * 3/2010 Hetherington ...... G06F 12/0846
711/3
11,023,803 B2 * 6/2021 Kalamkar .............. G06N 3/084
(Continued)

FOREIGN PATENT DOCUMENTS

CN  101911019  12/2010
CN  107703943  2/2018
(Continued)

OTHER PUBLICATIONS

Teschler, Lee. "Developing a mixed safety-critical IIoT robotic arm." Microcontroller Tips, WTWH Media LLC, Mar. 13, 2017, https://www.microcontrollertips.com/developing-mixed-safety-critical-iiot-robotic-arm/ (Year: 2017).*

(Continued)

*Primary Examiner* — Bhavesh V Amin
(74) *Attorney, Agent, or Firm* — Cozen O'Connor

(57) ABSTRACT

A method for changing or expanding application tasks of a manipulator via a first processor and a second processor and a system for guiding the movement of the manipulator, wherein the system includes a first processor for performing control tasks relating to guiding the movement, the control tasks being performable in real-time and being performable while complying with pre-definable, in particular certifiable, safety requirements, and includes at least one second processor for performing an application task formed from a path planning task and a task relating to processing user inputs, where the second processor can be adapted to perform at least one changed or further application task.

11 Claims, 4 Drawing Sheets

(58) Field of Classification Search
CPC ........ G05B 2219/2208; G05B 19/0421; G05B 9/02; G05B 9/03
See application file for complete search history.

(56) References Cited

U.S. PATENT DOCUMENTS

| | | | |
|---|---|---|---|
| 11,294,815 B2* | 4/2022 | Kreinin | G06F 9/3824 |
| 2002/0083387 A1* | 6/2002 | Miner | G01R 31/318552 714/E11.16 |
| 2004/0009250 A1* | 1/2004 | Schuermann | B29C 44/60 425/200 |
| 2004/0026388 A1* | 2/2004 | Staufer | B23K 9/173 219/137.2 |
| 2005/0065652 A1* | 3/2005 | Sakagami | G10L 15/26 704/E15.045 |
| 2007/0073439 A1* | 3/2007 | Habibi | G05B 19/4182 700/213 |
| 2007/0293989 A1* | 12/2007 | Norris | G05B 9/03 700/245 |
| 2009/0052325 A1* | 2/2009 | Dai | H04L 67/327 370/235 |
| 2009/0132088 A1* | 5/2009 | Taitler | G05B 19/42 700/264 |
| 2009/0187717 A1* | 7/2009 | Nasu | G06F 12/0802 711/141 |
| 2009/0192639 A1* | 7/2009 | Cellier | G06F 9/52 713/400 |
| 2009/0254217 A1* | 10/2009 | Pack | G06N 3/008 700/246 |
| 2010/0077177 A1* | 3/2010 | Luick | G06F 9/30196 712/28 |
| 2010/0198621 A1* | 8/2010 | Schafer | G16H 10/65 705/3 |
| 2010/0287556 A1 | 11/2010 | Munz | |
| 2011/0199194 A1* | 8/2011 | Waldock | G05B 19/12 340/10.51 |
| 2012/0036123 A1* | 2/2012 | Hasan | G06F 16/95 707/E17.084 |
| 2013/0018507 A1* | 1/2013 | Haag | B25J 9/161 700/245 |
| 2013/0041510 A1* | 2/2013 | Kurakake | G05B 19/4141 700/275 |
| 2013/0054024 A1* | 2/2013 | Bruemmer | B25J 9/1633 901/1 |
| 2013/0268117 A1* | 10/2013 | Staab | B25J 13/087 901/46 |
| 2014/0019392 A1* | 1/2014 | Buibas | G06N 3/008 706/23 |
| 2014/0025930 A1* | 1/2014 | Lee | G06F 12/084 712/205 |
| 2014/0026145 A1* | 1/2014 | Canedo | G06F 9/451 718/105 |
| 2014/0042950 A1* | 2/2014 | Aoyama | G05B 19/4148 318/569 |
| 2014/0058406 A1* | 2/2014 | Tsekos | A61B 34/30 606/130 |
| 2014/0058407 A1* | 2/2014 | Tsekos | A61B 34/30 606/130 |
| 2014/0149719 A1* | 5/2014 | Tabaru | G06F 9/3851 712/221 |
| 2014/0277735 A1* | 9/2014 | Breazeal | B25J 9/0003 700/259 |
| 2014/0311811 A1* | 10/2014 | Niederberger | B62D 55/265 901/1 |
| 2014/0316565 A1* | 10/2014 | Aoyama | G05B 19/4148 901/41 |
| 2014/0351825 A1* | 11/2014 | Xu | G06F 9/526 718/106 |
| 2015/0199458 A1* | 7/2015 | Bacon | G06F 30/20 703/8 |
| 2015/0274294 A1* | 10/2015 | Dahlstrom | B05B 13/0278 239/722 |
| 2015/0314454 A1* | 11/2015 | Breazeal | G10L 15/32 700/259 |
| 2015/0339570 A1* | 11/2015 | Scheffler | G06N 3/04 706/27 |
| 2016/0014252 A1* | 1/2016 | Biderman | A61G 5/04 701/29.2 |
| 2016/0059853 A1* | 3/2016 | Yamakoshi | H04L 12/00 701/36 |
| 2016/0125202 A1* | 5/2016 | Pohl | G06F 21/72 726/26 |
| 2016/0207194 A1* | 7/2016 | Blood | B25J 9/1615 |
| 2016/0221186 A1* | 8/2016 | Perrone | B25J 9/1661 |
| 2016/0224013 A1* | 8/2016 | Endou | G05B 9/02 |
| 2017/0085313 A1* | 3/2017 | Stationwala | H04W 76/23 |
| 2017/0103022 A1* | 4/2017 | Kreinin | G06F 15/7867 |
| 2017/0113353 A1* | 4/2017 | Monceaux | G10L 15/22 |
| 2017/0120441 A1* | 5/2017 | Guerin | B25J 9/161 |
| 2017/0125008 A1* | 5/2017 | Maisonnier | G10L 13/08 |
| 2017/0135772 A1* | 5/2017 | Tsekos | B25J 9/106 |
| 2017/0146967 A1 | 5/2017 | Hatanaka | |
| 2017/0217013 A1* | 8/2017 | Iqtidar | B29C 64/20 |
| 2017/0228011 A1* | 8/2017 | Abadi | G06F 1/325 |
| 2018/0095467 A1* | 4/2018 | Perrone | G05D 1/0088 |
| 2018/0293492 A1* | 10/2018 | Kalamkar | G06T 1/20 |
| 2018/0307899 A1* | 10/2018 | Das | G06V 10/955 |
| 2018/0308202 A1* | 10/2018 | Appu | G06N 3/045 |
| 2018/0322606 A1* | 11/2018 | Das | G06N 3/063 |
| 2019/0026213 A1* | 1/2019 | Mayer | G06F 11/348 |
| 2019/0050269 A1* | 2/2019 | Anderson | G06F 9/5077 |
| 2019/0095355 A1 | 3/2019 | Timbert et al. | |
| 2019/0184569 A1* | 6/2019 | Huang | B25J 11/0085 |
| 2020/0280771 A1* | 9/2020 | Hoang | G01D 4/002 |
| 2020/0361087 A1* | 11/2020 | Ender | B25J 9/1664 |
| 2021/0026320 A1* | 1/2021 | Bivans | G05B 19/406 |
| 2021/0350212 A1* | 11/2021 | Kalamkar | G06N 3/044 |

FOREIGN PATENT DOCUMENTS

| | | |
|---|---|---|
| CN | 109558372 | 4/2019 |
| DE | 102006040417 | 8/2007 |
| DE | 102014005557 | 10/2014 |
| DE | 102014222181 | 5/2016 |
| DE | 102016014152 | 6/2017 |
| EP | 2546029 | 1/2013 |

OTHER PUBLICATIONS

Wei, Hongxing. "RT-ROS: A real-time ROS architecture on multi-core processors." Future Generation Computer Systems 56, 2016, pp. 171-178, https://web.ics.purdue.edu/~rvoyles/Classes/RealTimeSystems_files/RT-ROS.FGCS2016.pdf (Year: 2016).*
https://de.wikipedia.org/wiki/Baseband-Prozessor; 2020.
http://www.robotic.de/fileadmin/robotic/joerg/paper/joerg2011computingAndCommunicationArchitecture.pdf The Computing and Communication Architecture of the DLR Hand Arm System, Stefan Jörg, Mathias Nickl, Alexander Nothhelfer, Thomas Bahls, Gerd Hirzinger, pp. 1-8; 2011.
EP Search Report dated Jan. 10, 2020 based on EP 19174700.

* cited by examiner

SYSTEM FOR GUIDING THE MOVEMENT OF A MANIPULATOR HAVING A FIRST PROCESSOR AND AT LEAST ONE SECOND PROCESSOR

BACKGROUND OF THE INVENTION

1. Field of the Invention

The invention relates to a system for guiding the movement of a manipulator having a first processor and at least one second processor, and to a method for changing or expanding the application tasks of a manipulator via of the first and second processors.

2. Description of the Related Art

Conventional manipulators, also called robots, are frequently equipped with a real-time operating system. The path planning and the control of the manipulator are implemented in the real-time system. In addition to the control, reliable monitoring is needed to comply with safety requirements. Here, for example, use is made of applications and sensors which, with respect to signal processing, must be executed or processed in real-time. For this purpose, multi-core processors are conventionally used, which perform various implementations of a processing task in software. With different implementations on various cores of a processor, for example, safety requirements are satisfied. In order to satisfy real-time requirements, for example, multiple cores of a processor can be provided, to which, for example, the signal processing and the control are divided.

In addition, it is known to provide redundant processing in software via measures, such as coded processing methods, via which safety requirements can likewise be satisfied.

Depending on the use of such a processor in a system, and depending on the requirements on the system with respect to safety or security measures, the system must be tested, certified or checked. Depending on the application, for example, only a system certified with the installed processor may be used. For instance, a robot gripper arm may be used in a plant only when it has been tested and certified as a total system with the specific installed chip.

In the event of a change of the application or a necessary system conversion, adaptation of the installed processor may be necessary, which makes renewed certification of the total system necessary. For example, a controller for controlling and path planning of a manipulator must be re-certified if the processor must be adapted or replaced, such as for a more complex processing task.

SUMMARY OF THE INVENTION

In view of the foregoing, it is an object of the present invention to provide a more flexible system for guiding the movement of a manipulator.

This and other objects and advantages are achieved in accordance with the invention by a system for guiding the movement of a manipulator having a first processor for performing control tasks relating to guiding the movement, where the control tasks can be performed in real-time and can be performed while complying with pre definable, in particular certifiable, safety requirements, and having at least one second processor for performing an application task comprising a path planning task and a task relating to processing user inputs, where the second processor can be adapted to perform at least one changed or further application task.

Control tasks are thus divided into those that must satisfy real-time requirements and, in addition must, satisfy safety requirements and those that relate to application tasks, such as path planning and processing user inputs. A demonstration of compliance with pre-definable safety requirements, such as via certification, thus advantageously can be performed only for the first processor. This first processor is thus provided for the control for guiding the movement, also called motion control, and is typically used in applications in which the control has to be carried out in real time, so that the first processor must be real-time capable. In addition, safety requirements must typically be complied with.

The second processor is used as an application processor and is set up to perform the application tasks such as the application of the path planning and the processing of user inputs. The task of processing user inputs is predefined, for example, by a graphic user interface, and an associated program. Such a graphic user interface or graphical user interface (GUI) can run as an application on the second processor.

The second processor advantageously is not required to be certified or satisfy any pre-definable safety requirements. Adaptation of the second processor, for example, expansion or replacement of the second processor in order to perform more complex or changed applications, is thus possible completely independently of the first processor. Thus, renewed checking for compliance with pre-definable safety requirements of the first processor is advantageously eliminated, in particular renewed certification. The second processor can be adapted to perform at least one changed application task or a further application task. For example, an ability to expand the second processor can consist in the provision of an additional core of the processor. The adaptability can also consist in reprogramming an application program on the second processor.

An application task is understood to be a task relating to processing data via the second processor, which is not the control task, and permits the use of the manipulator for a predefined application.

A changed application task is understood to be such a task to be performed by the second processor, which differs from the application task with regard to the possibility of using the manipulator in an application. A further application task is understood to be an additional application task that permits possible applications or possible uses of the manipulator that are not covered by the application task. For example, a path planning mechanism is adapted, changed optimization algorithms are used, or a GUI is expanded or modified for the pre-definition of other or additional user data, or use is additionally made of an application that permits processing of a camera image for path planning.

Advantageously, the adaptation of the second processor or the expansion of the second processor is performed without adapting the first processor. In particular, certification of the second processor for use of the manipulator in an application is advantageously not necessary. Therefore, even in the event of expansion or adaptation of the second processor, re-certification is dispensed with.

In accordance with one embodiment, the changed or further application task can be performed and set up on the second processor with no reaction on the control tasks of the first processor. The respective processing of data on the first processor and the second processor is thus strictly separated. Modifying the second processor leaves the logic of the first processor unchanged.

The control tasks of the first processor thus remain unchanged and checking for compliance with the pre-definable safety requirements, in particular certification, is thus not necessary. The changing or expansion of the application task of the second processor, in particular the provision of a further core, can thus be performed without any reaction on the first processor or without any interaction with the first processor.

In accordance with a further embodiment, a real-time operating system is set up on the first processor. Thus, the complicated provision of a real-time operating system is advantageously needed only on the first processor. The second processor is not required to perform processing tasks in real-time.

The real-time operating system on the first processor is advantageously directed to the functional scope of the manipulator. There is a focus on manipulator calculations in the first processor with a fixed structure or fixed hardware performance. Thus, it is possible to reduce costs that would arise from a more powerful processor, for example, for control and path planning, and associated more complicated certification of a processor on which the application tasks are also performed.

In accordance with another embodiment, the first processor is formed as a computer chip having a first, a second and a third core, where the first core performs the control task, and the second and the third core perform a safety task. The first processor, which must satisfy the requirements with respect to real-time and safety, can thus be a multi-core processor. In particular, a division is made to the first core for the control and to two further cores for the safety. Such a three-core motion chip can then advantageously be certified, for example at the TÜV (Technischer Überwachungsverein; English translation: Technical Inspection Association).

In accordance with a further embodiment, the second processor is formed as a multi-core processor. The second processor, as an application processor, can be adapted depending on the application. For example, expansion to a multi-core processor can be performed if required by the application tasks. Alternatively, it is likewise conceivable to install a single-core processor with sufficiently high computing power.

In accordance with an embodiment, the system is formed as a controller for a manipulator.

It is also an object of the invention to provide a manipulator having a system in accordance with the above-described embodiments.

It is also an object of the invention to provide a method for changing or expanding application tasks of a manipulator, where the application task comprises a path planning task and a task relating to processing user inputs is performed on a second processor. In accordance with the method of the invention, the application task comprising a path planning task and a task relating to processing user inputs is performed on a second processor, at least one changed or further application task is set up on the second processor, control tasks relating to guiding the movement are performed on a first processor, the control tasks are performed in real-time and while complying with predefinable, in particular certifiable, safety requirements, and the at least one changed or further application task is set up with no reaction on the first processor.

In accordance with one embodiment, the changed or further application task is set up as an add-on or as a plug-in to existing application tasks. Thus, the add-ons or plug-ins are not a constituent part of the first processor and can be changed or adapted as desired. Only the second processor is adapted, and does not have to be certified, on account of the separation from the first processor having the control tasks of the manipulator.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be explained in more detail below by using exemplary embodiments and with the aid of the figures, in which.

DETAILED DESCRIPTION OF THE EXEMPLARY EMBODIMENT

Figure 1:
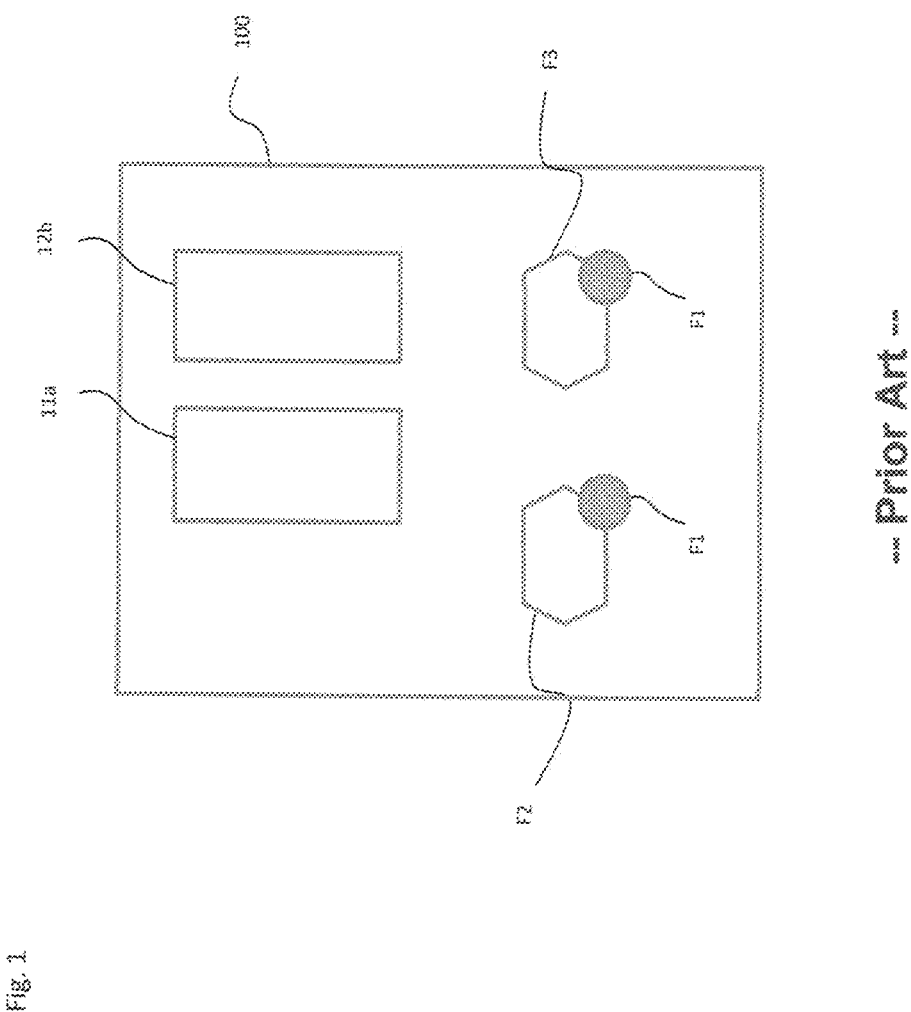
FIG. 1 shows a schematic representation of a processor for controlling a robot in accordance with the prior art.

By using FIG. 1, the intention is to illustrate how controllers for manipulators or robots are formed in the prior art. For example, a dual operating system 100 is provided, having two cores 11a, 12b of a processor. In order to be able to perform the control function F2 and the path planning function F3 for a robot gripper arm in a safe manner, a safety controller runs two instances of the safe operating system, each on a core of the processor. Thus, the control F2 and the path planning F3 are each implemented as safe functions F1. Thus, all three tasks responsible for the execution of a robot movement, i.e., the path planning, the control and the safety, run on the same CPU. Thus, each of the aforementioned tasks can be monitored and influenced by each other task.

Figure 2:
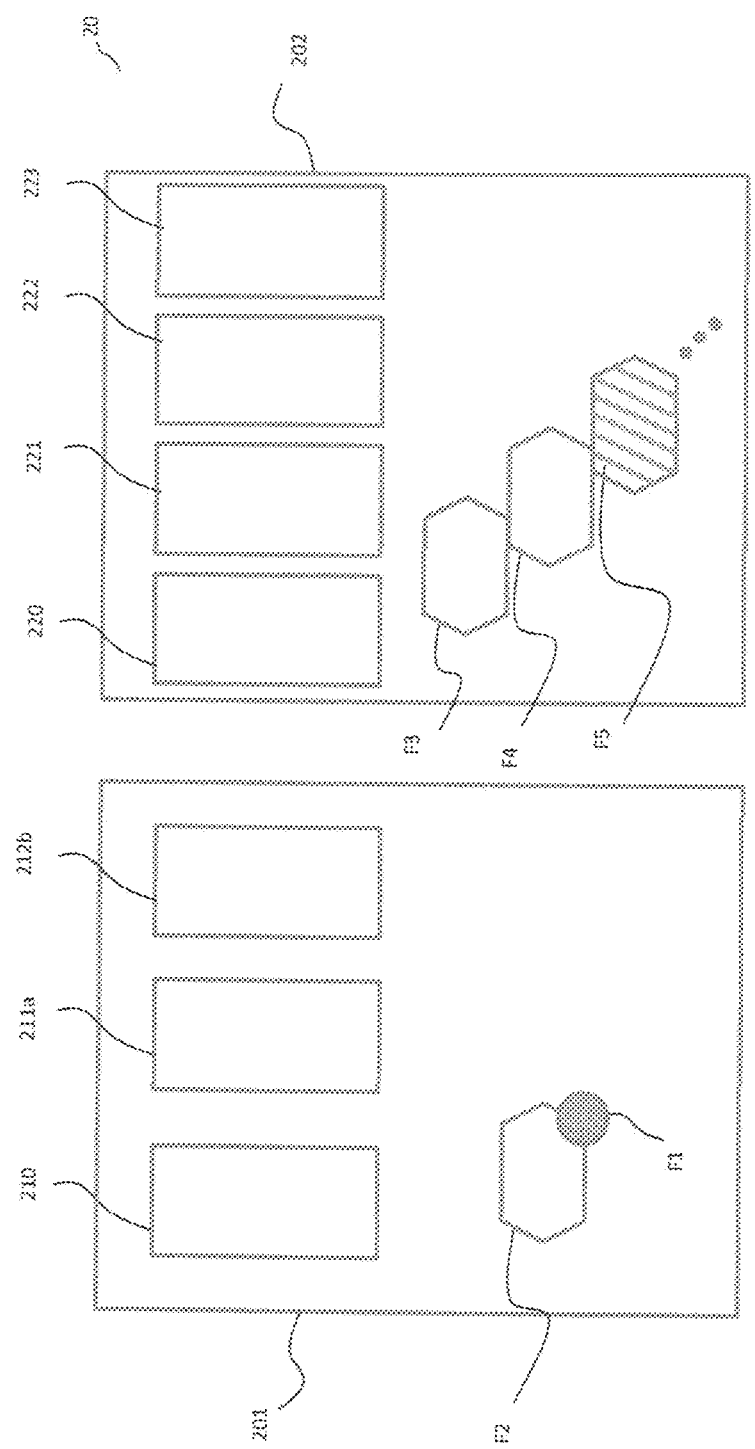
FIG. 2 shows a schematic representation of the system for guiding the movement of a manipulator in accordance with a first exemplary embodiment of the invention.

By contrast, a system for guiding the movement of a manipulator in accordance with a first exemplary embodiment of the invention is shown in FIG. 2. Here, the system 20 for guiding the movement of the manipulator has a first processor 201 and a second processor 202. The control tasks relating to guiding movement 2 are performed on the first processor 201.

For common robot applications, the control tasks must be performable in real-time and in addition satisfy pre-definable and, in particular, certified safety requirements. The first processor 201 is formed such that the predefined safety requirements F1 are complied with.

The first processor 201 is formed such that, for example, a first core 210, a second core 211a and a third core 212b are provided. For example, the first core 210 is provided to perform the control task F2. The second core 211*a* and the third core 211*b* perform the safety task F1. For this purpose, the second core 211*a* and the third core 212*b* are, for example, two dedicated safety cores each having a different implementation of the software for performing a cross-comparison of the parallel executions of the software. Thus, the first processor 201 performs safety-directed control of the manipulator.

The second processor 202 is provided to perform a path planning task F3. This does not necessarily have to be executed in a safety-oriented manner. Therefore, this path planning task F3 has not been provided on the first processor 201, which is safety-certified, but on the second processor 202, which is not certified. In addition, a task relating to processing user inputs F4 is performed on the second processor 202.

Via a graphical user interface (GUI), the interaction between an operator or a user of the manipulator and the controller is possible. The GUI defines which possibilities there are for user inputs. For example, boundary conditions, such as the objects to be gripped in a pick and place method or material parameters of objects to be processed or the like, are predefined by the operator through the GUI. For example, a gripping task or in particular the sequence of gripping and lever movements can also be predefined, here.

For this purpose, for example, four cores 220 to 223 are advantageously provided on the second processor 202. Such a four-core processor is particularly advantageous in order to perform complicated tasks provided on the second processor 202 or many tasks to be executed in parallel. Computer-intensive tasks are divided up to multiple cores and, as a result of such parallelization, the performance is increased.

Tasks provided to be executed on the second processor 202 are not required to satisfy specific predefined safety requirements. Therefore, certification of the processor is also not required. Changing the hardware or software of the second processor thus remains without any effect on the safety-relevant tasks of the first processor 201 and thus also without any effect on certification that has already been passed satisfactorily.

Particularly advantageously, an application task that is to be provided on the second processor 202 can be modified flexibly or added to with the proposed system 20. For example, on account of a changed use of the manipulator in an application, a camera can be newly installed and the camera image of an object to be gripped can be taken into account in the control. The result of an evaluation of the camera image is intended, for example, to influence the path planning of the manipulator.

For the input of data for the further processing and evaluation of the camera image, a further application task F5 is provided on the second processor 202. To illustrate the fact that the further application task F5 has only been extended retrospectively, the function is identified by a hatched function box in FIG. 2.

In a conventional robot controller with a single processor, the processor would have to be certified again as a result of the extension of the further application task. The addition of the further application task F5 in accordance with the first exemplary embodiment of the invention can, on the other hand, leave certification of the first processor 201 untouched, because the application tasks on the second processor 202 are adapted without any reaction on the first processor 201. This is possible as a result of the provision of the separate processors or CPUs on the system 20 for guiding movement.

Figure 3:
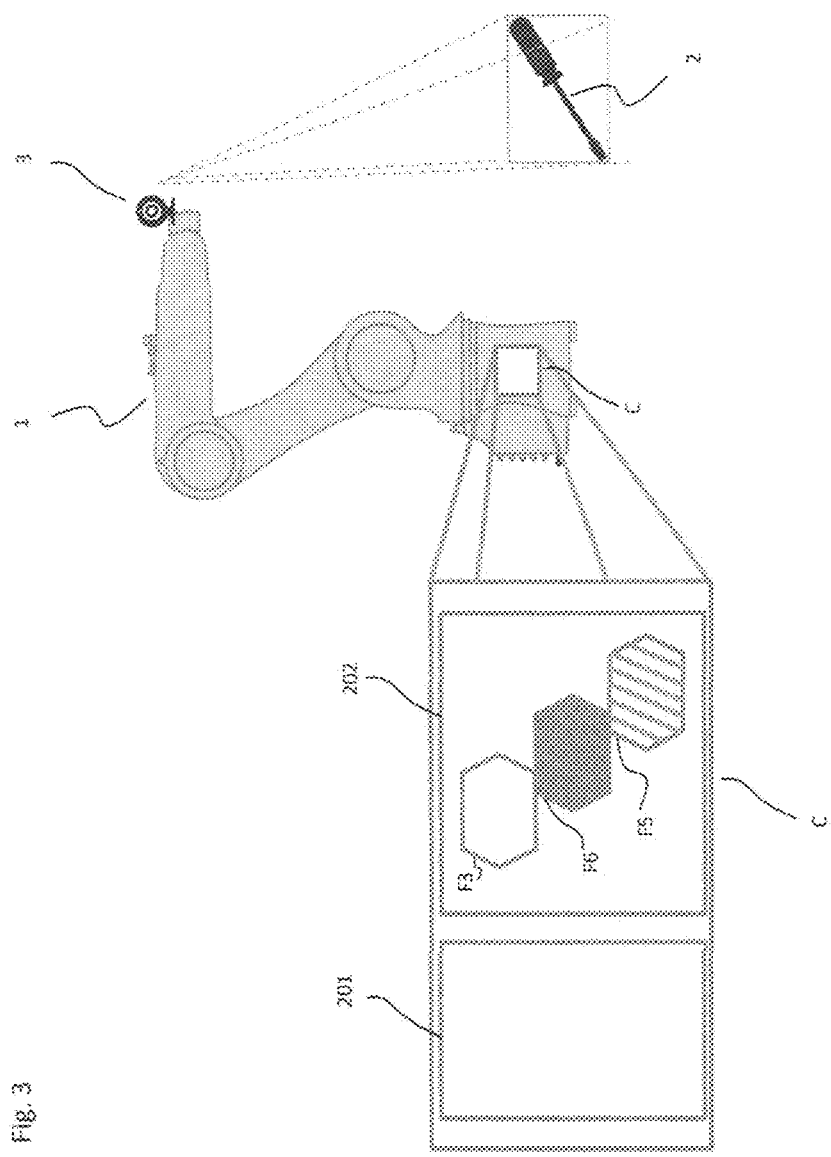
FIG. 3 shows a schematic representation of a manipulator with controller for guiding movement in accordance with a second exemplary embodiment of the invention.

The first exemplary embodiment is addressed in FIG. 3, where a manipulator 1 is to be moved via a movement controller C to fulfill a robot gripping task. A tool 2 is to be gripped by the manipulator to then perform a processing task. In order to permit flexible and variable starting positions of the tool, a camera image is to be provided for the controller C of the manipulator, by using which path planning can be adapted by the controller C to the starting position of the tool. For example, a different path for picking up the tool is selected, depending on the initial position of the tool. Provided on the controller C is a first processor 201, which is safety-certified. This first processor 201 is responsible for the control tasks relating to the movement of the manipulator.

The safety requirements can have different levels of strictness, depending on the area of use. Certification ensures that a controller used for the manipulator is approved in the envisaged application. For example, it must be ensured that protective zones that are required by human-robot interaction are complied with. For example, additionally provided stop operations for stopping the robot and emergency-stop methods must be set up safely.

The controller C additionally has a second processor 202, which is responsible for the application tasks of the manipulator. These application tasks are not safety-certified. For example, the second processor 202 has a further application task F5, as has already been described in connection with the first exemplary embodiment. The further application task F5 has become necessary with the installation of the camera in the application described and ensures processing of the camera image and analysis of the data thus received for the path planning task F3.

In accordance with the second exemplary embodiment of the invention, a changed application task F6 is now to be additionally set up on the second processor 202, which task modifies the application task relating to processing user inputs F4. A graphic user interface is to be adapted such that wizard-supported programming of G code is made possible. For example, additional adaptation of the gripping task is to be performed, depending on the detected type of tool. For this purpose, a program that provides different gripping mechanisms for different types of tools, in particular depending on the position, is written in G code. The change to the application task F4 toward the changed application task F6 has been identified graphically in FIG. 3 by a filled function box.

For example, changed or additional G codes are intended to be able to be predefined flexibly via the graphic user interface. In particular, re-certification of the entire controller C is intended not to be necessary after each adaptation.

As a result of the separation and division of the tasks that must satisfy real-time and safety requirements from the application tasks that are not required to satisfy the requirements to two different processors, an increase in efficiency is advantageously achieved based on restricting the certification to the most necessary. Thus, more economical production of robot control is possible.

The safety chip is, for example, certifiable via the TÜV and can be integrated into a control system as a standard subassembly together with the application processor. For example, four or more cores are provided as standard for the application processor. Depending on the complexity of the application tasks which, for example, are to be made possible for an eight-axis robot, the four-core application processor can be further expanded by additional cores. Both the expansion of the application tasks and the expansion of the chip architecture to multiple cores leaves untouched the certification that was obtained by safety requirements and the check of the first processor in tests.

Figure 4:
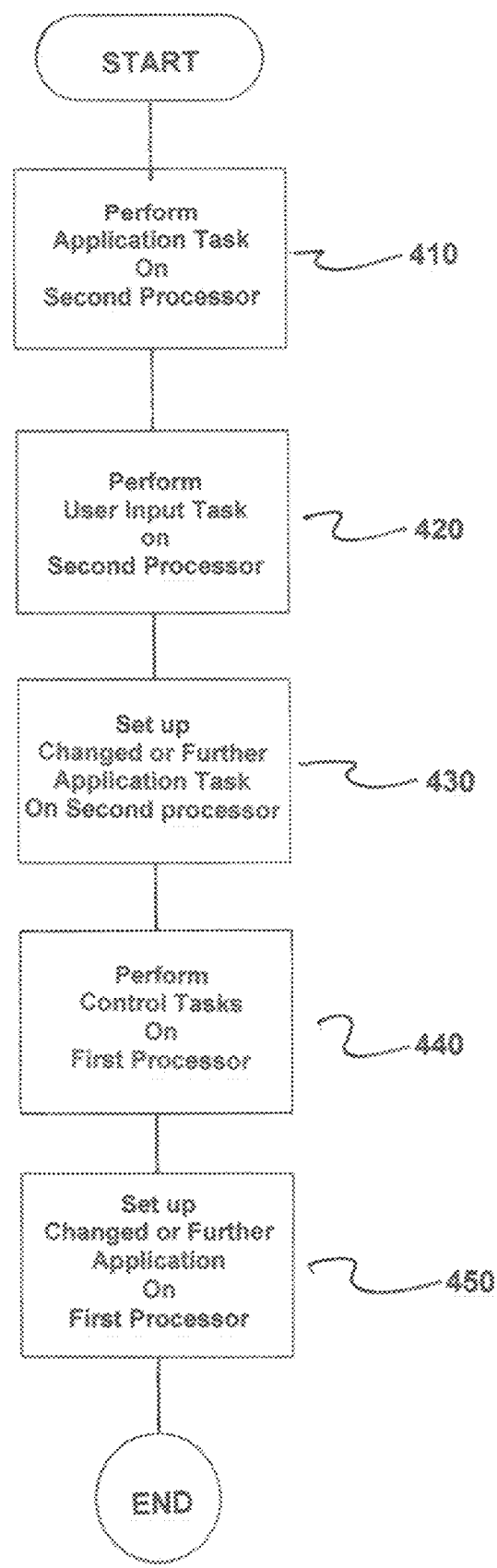
FIG. 4 is a flowchart of the method in accordance with the invention.

FIG. 4 is a flowchart of the method for changing or expanding the application task of a manipulator 1. The method comprises performing the application task F3 on a second processor 202, as indicated in step 410. In accordance with the invention, the application task comprises a path planning task F3. Next, a task relating to processing user inputs F4 is performed on the second processor 202, as indicated in step 420.

Next, at least one changed or further application task is set up on the second processor 202, as indicated in step 430. Next, control tasks F2 relating to guiding movement a manipulator 1 are performed on a first processor 201 in real-time while complying with pre-definable safety requirements F1, as indicated in step 440. Next, the at least one changed or further application task is set up with no reaction on the first processor 201, as indicated in step 450.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A system for guiding movement of a manipulator which has been tested for compliance with safety requirements for operation of the manipulator within a protective zone or with stop operations, comprising:
    a first multi-core processor which only performs control tasks relating to guiding the movement of the manipulator, the control tasks being performed in real time and being performed while complying with the safety requirements, and changes to the first multi-core processor including re-testing to determine compliance with the safety requirements; and
    at least one second multi-core processor which only performs an application task which comprises a path planning task and a task relating to processing user inputs, changes to the second multi-core processor not including re-testing for compliance with the safety requirements.

2. The system as claimed in claim 1, wherein the changes to the second multi-core processor not including re-testing for compliance with the safety requirements are performed and set up on the second multi-core processor with no reaction on the control tasks of the first multi-core processor.

3. The system is claimed in claim 1, wherein a real-time operating system is set up on the first multi-core processor.

4. The system is claimed in claim 2, wherein a real-time operating system is set up on the first multi-core processor.

5. The system as claimed in claim 1, wherein the first multi-core processor is formed as a computer chip having a first, a second and a third core, the first core performing the control task, and the second and the third core performing a safety task.

6. The system as claimed in claim 1, wherein the system is formed as a controller for a manipulator.

7. The system as claimed in claim 1, wherein the safety requirements are certified.

8. A manipulator including:
    a system for guiding movement of the manipulator which has been tested for compliance with safety requirements for operation of the manipulator within a protective zone or with stop operations, the system comprising:
        a first multi-core processor which only performs control tasks relating to guiding the movement of the manipulator, the control tasks being performed in real-time and being performed while complying with the safety requirements, and changes to the first multi-core processor including re-testing to determine compliance with the safety requirements; and
        at least one second multi-core processor which only performs an application task which comprises a path planning task and a task relating to processing user inputs, changes to the second multi-core processor not including re-testing for compliance with the safety requirements.

9. A method for changing or expanding an application task of a manipulator which has been tested for compliance with safety requirements for operation of the manipulator within a protective zone or with stop operations, the method comprising:
    performing control tasks relating to guiding movement of a manipulator on a first multi-core processor in real time while complying with the safety requirements;
    setting up changes to the first multi-core processor, changes to the first multi-core processor not including re-testing for compliance with the safety requirements;
    performing the application task on a second multi-core processor, said application task comprising a path planning task;
    performing, on the second multi-core processor, a task relating to processing user inputs;
    setting up changes to the second multi-core processor changes to the second multi-core processor including re-testing to determine compliance with the safety requirements;
    wherein the second multi-core processor only performs the control tasks relating to guiding the movement of the manipulator and the first multi-core processor only performs application tasks which comprise the path planning task and the task relating to processing user inputs.

10. The method as claimed in claim 9, wherein the changes to the first multi-core processor not including re-testing for compliance with the safety requirements are set up as an add-on or as a plug-in to existing application tasks.

11. The system as claimed in claim 9, wherein the safety requirements are certified.

* * * * *